United States Patent [19]

Taniguchi

[11] Patent Number: 5,122,981
[45] Date of Patent: Jun. 16, 1992

[54] FLOATING POINT PROCESSOR WITH HIGH SPEED ROUNDING CIRCUIT

[75] Inventor: Takashi Taniguchi, Osaka, Japan

[73] Assignee: Matsushita Electric Industrial Co., Ltd., Osaka, Japan

[21] Appl. No.: 327,656

[22] Filed: Mar. 23, 1989

[30] Foreign Application Priority Data

Mar. 23, 1988 [JP] Japan ................ 63-68600

[51] Int. Cl.⁵ .................................. G06F 7/38
[52] U.S. Cl. ........................ 364/748; 364/745
[58] Field of Search ........... 364/715.01, 748, 768, 364/770, 744, 745, 736.5

[56] References Cited

U.S. PATENT DOCUMENTS

| | | | |
|---|---|---|---|
| 3,814,925 | 6/1974 | Spannagel | 364/748 |
| 4,075,704 | 2/1978 | O'Leary | 364/748 |
| 4,218,751 | 8/1990 | McManigal | 364/784 |
| 4,562,553 | 12/1985 | Mattedi et al. | 364/745 |
| 4,592,006 | 5/1986 | Hagiwara et al. | 364/748 |
| 4,644,490 | 2/1987 | Kobayashi et al. | 364/748 |
| 4,779,220 | 10/1988 | Nukuyama | 364/745 |
| 4,809,172 | 2/1989 | Nukiyama | 364/748 |
| 4,841,467 | 6/1989 | Ho et al. | 364/748 |
| 4,849,921 | 7/1989 | Yasumoto et al. | 364/715.01 |
| 4,858,165 | 8/1990 | Gronowski | 364/748 |
| 4,888,722 | 12/1989 | Boreland | 364/736.5 |

FOREIGN PATENT DOCUMENTS 0020833  2/1978  Japan ................ 364/715.01

Primary Examiner—Dale M. Shaw
Attorney, Agent, or Firm—Lowe, Price, LeBlanc & Becker

[57] ABSTRACT

A floating point processor comprises a first arithmetic unit that adds to or substracts from a first fraction of a first floating point member, a second fraction of a second floating point member. The second number has a weight of corresponding bits equal to that of the first floating point number by being right shifted. The exponent of the second number is less than that of the first number. A second arithmetic unit performs the same adding or substracting operation that the first arithmetic unit performs on the first fraction and the sum of the second fraction and adds the resultant to "1". An inverter reverses every bit derived by the second arithmetic unit. Outputs of the first and second arithmetic units and inverter are supplied to a selector.

8 Claims, 8 Drawing Sheets

FIG. 3

| $z_1^0$ $z_0^0$ $y_G$ $y_R y_S$ | CRU | CRM |
|---|---|---|
| 0 0 0 0 | * | 0 |
| 0 0 0 1 | * | 0 |
| 0 0 1 0 | * | 0 |
| 0 0 1 1 | * | 1 |
| 0 1 0 0 | 0 | 0 |
| 0 1 0 1 | 1 | 0 |
| 0 1 1 0 | 1 | 1 |
| 0 1 1 1 | 1 | 1 |
| 1 0 0 0 | * | 0 |
| 1 0 0 1 | * | 0 |
| 1 0 1 0 | * | 0 |
| 1 0 1 1 | * | 1 |
| 1 1 0 0 | 1 | 0 |
| 1 1 0 1 | 1 | 0 |
| 1 1 1 0 | 1 | 1 |
| 1 1 1 1 | 1 | 1 |

FIG. 4

| $z_0^0$ $y_G$ $y_R$ $y_S$ | CRM | CRL |
|---|---|---|
| 0 0 0 0 | 0 | 0 |
| 0 0 0 1 | 0 | 0 |
| 0 0 1 0 | 0 | 0 |
| 0 0 1 1 | 0 | -1 |
| 0 1 0 0 | 0 | -1 |
| 0 1 0 1 | -1 | -1 |
| 0 1 1 0 | -1 | -1 |
| 0 1 1 1 | -1 | -1 |
| 1 0 0 0 | 0 | 0 |
| 1 0 0 1 | 0 | 0 |
| 1 0 1 0 | 0 | 0 |
| 1 0 1 1 | 0 | -1 |
| 1 1 0 0 | -1 | -1 |
| 1 1 0 1 | -1 | -1 |
| 1 1 1 0 | -1 | -1 |
| 1 1 1 1 | -1 | -1 |

FLOATING POINT PROCESSOR WITH HIGH SPEED ROUNDING CIRCUIT

BACKGROUND OF THE INVENTION

1. Field of the Invention

This invention generally relates to an arithmetic processor and more particularly to an improved floating point processor which can perform arithmetic operation on the fraction of a floating point number, obtain the absolute value of the result of the operation and round the result of the operation at high speed by using a small number of circuit elements.

2. Description of the Related Art

Ordinary floating point operation is performed by a processor having typical construction as shown in FIG. 1. In this figure, reference characters XI, Ex and Fx indicate input data, an exponent part (hereunder sometimes referred to simply as an exponent) and a fraction part (hereunder sometimes referred to simply as a fraction) of the input data, respectively. Further, reference characters YI, Ey and Fy denote another input data, an exponent part and a fraction part of the input data YI, respectively. Moreover, reference characters Z0, Er and Fz indicate output data, an exponent part and a fraction part of the output data, respectively. Furthermore, reference numerals 500 and 501 indicate a processor for arithmetic operation of a fraction and an exponent comparator, respectively. Reference numerals 502, 503 and 504 indicate selection circuits. Furthermore, 505, 507, 509 and 510 indicate a shifter, an adder, a rounding circuit and a normalization circuit, respectively. Additionally, reference numerals 506 and 508 indicate complement data generators.

The operation of a conventional processor illustrated in FIG. 1 is now described in detail. First, the exponent parts Ex and Ey of the input data XI and YI are compared by the exponent comparator 501 by subtracting one of these exponent parts from the other thereof. Further, the selection circuits 502 and 503 are controlled such that the fraction part of the input data, of which the exponent part is less than that of the other data, of the parts Ex and Ey is inputted into the shifter 505 and on the other hand that of the other of the input data XI and YI is inputted into the complement data generator 506. Moreover, the selection circuit 504 is controlled such that the larger one of the exponent parts Ex and Ey is inputted into the normalization circuit 510. The absolute value of the difference between the exponent parts Ex and Ey is then inputted into the shifter 505. Next, the fraction inputted into the shifter 505 is shifted to right by the number of digits corresponding to the difference between the exponent parts Ex and Ey and the weight of corresponding bits of two fraction parts Fx and Fy are made equal to each other. At this time, additional three bits are obtained from the bits "crowded out of" the shifter 505 from the right end thereof by the shift of digits to right therein. The most significant bit of these three bits is called "a guard bit" and is the most significant one of the "crowded out" bits. The second most significant bit of the additional three bits is called "a round bit" and is the second most significant one of the "crowded out" bits. The least significant bit of the three bits, called "a sticky bit", is obtained by the logical OR of the remaining one of the "crowded out" bits. These three bits are added to the least significant bit of the fraction part supplied to and shifted in the shifter 505 below the least significant bit thereof and are used to round the numerical value of the result of the arithmetic operation. Thereafter, if the arithmetic operation as to the fraction is addition, the fraction outputted from the selection circuit 502 is further outputted by the complement data generator 506 to the adder 507 as it is. On the other hand, if the arithmetic operation relating to the fraction is subtraction, the two's complement of the fraction outputted is generated and then outputted by the complement data generator 506 to the adder 507. Further, the fractions, of which the weight of corresponding bits are made equal to each other, are added by the adder 507. Then, in order to obtain the absolute value of the result of the addition of the fractions, in case that the result of the addition effected by the adder 507 is positive, the result of the addition is outputted by the complement data generator 508 to further output the rounding circuit 509 as it is. On the other hand, if the result of the addition is negative, the two's complement of the result of the addition effected by the adder 507 is generated and further outputted to the rounding circuit 509 by the complement data generator 508. In the rounding circuit 509, the value of the result of the arithmetic operation of the fraction received from the generator 508 is rounded. Finally, the value resulted from the above described arithmetic operations of the fractions (hereunder referred to simply as "the interim or temporary result") is shifted to right or left by the number of digits required to the normalization thereof by the normalization circuit 510. Thereafter, in case that the "interim result" is shifted to right, the amount of the shifted number of digits is added to the exponent inputted to the normalization circuit 510. Further, in case that the "interim result" is shifted to left, the amount of the shifted number of digits is subtracted from the exponent inputted to the normalization circuit 510. Moreover, floating point overflow or floating point underflow is detected by judging whether or not the result of this operation of the exponent exceeds a predetermined range. If not detected, the result of this operation is outputted as it is,. Contrarily, if detected, the result of this operation is modified and thus the process of the above described operations is completed.

As above stated, in order to obtain the absolute value of the fraction, the output of the adder 507 is inputted to the rounding circuit 509 as it is if the output of the adder 507 is positive. Further, if negative, two's complement of the output of the adder 507 is to be generated and further outputted to the rounding circuit 509. Practically, the generation of the two3 s complement by this complement data generator 508 is effected by logically inverting each bit of the input data and further adding 1 to the least significant bit of the inverted input data. Accordingly, the conventional arithmetic circuit has a drawback that if the result of the arithmetic operation such as the addition of the fractions is negative, two's complement is to be generated and thus it takes such of the operation time and further the configuration of the circuits is complex.

Furthermore, in the arithmetic circuit, on completion of the addition of the fractions, the rounding of the result of the addition is effected by the rounding circuit 509. In this rounding operation, the digit to be rounded should be detected in the results, of which the absolute value is obtained, of the arithmetic operation and further a carry generated by the rounding should be added to the detected to digit. Thus, the prior art arithmetic circuit has a defect that in such a case, the rounding operation cannot be started unless the absolute value of the result of the arithmetic operation is determined and that it takes much of the operation time to round the result of the arithmetic circuit and the complex circuit is required for the rounding operation.

Further, the exponent comparator 501 is a circuit for comparing the two input data with each other, detecting the relation in magnitude between the two input data and obtaining the absolute value of the difference in magnitude between the two input data. Concurrently, the exponent comparator 501 subtracts a second input data from a first input data and judges from the overflow whether the result of the subtraction is positive or negative. Further, the exponent comparator 501 outputs the result of the subtraction as it is if the result of the subtraction is positive. If negative, the comparator 501 outputs two's complement of the result of the subtraction is outputted to obtain the value of the result when the sign of the value is reversed. The generation of the two's complement is concretely effected by logically reversing each bit of the input data and adding 1 to the lest significant bit of the logically reversing data. Thus, if the result of the subtraction is negative, an operation of further adding 1 to the result thereof is additionally required. Therefore, the conventional arithmetic circuit has another drawback that it takes much time to obtain the absolute value of the difference and further the adder as well as the subtracter is needed so that the arithmetic processor becomes large in size.

Further, in the normalization circuit 510, a floating point underflow and a floating point overflow are detected. According to IEEE 754 Floating Point Arithmetic Standard, the number of digits of exponent part is determined to be 8 is case of single precision; 11 in case of double precision; and 15 in case of extended double precision, respectively. Further, the range of the exponent of the ordinary normalized floating point data Exp is as follows:

$$0 < Exp < 2^n - 1$$

where n is the number of digits in an exponent.

If the arithmetic operation of the exponent results in that $Exp \leq 0$, a floating point underflow occurs. Further, if $Exp \geq 2^n - 1$, a floating point overflow occurs. Namely, it is necessary to determine the range of the result of the operation of the exponent. Thus, the conventional arithmetic processor has still another drawback that if a floating point underflow or floating point overflow is detected after the exponent correction operation accompanied by the normalization of the fraction is fully completed, the output of the detection signal is delayed.

SUMMARY OF THE INVENTION

The present invention is accomplished to eliminate the above described drawbacks of the conventional arithmetic processor.

It is, accordingly, a first or primary object of the present invention to provide an arithmetic processor which can perform arithmetic operation on fractions, obtain the absolute value of the result of the arithmetic operation and round the result at high speed in floating point operation by using circuit elements which are smaller in number than that of the circuit elements of the prior art processor.

Further, it is a second object of the present invention to provide an arithmetic processor which can output the absolute value of the difference between two data at high speed by using circuit elements which are smaller in number than that of the circuit elements of the prior art processor.

Moreover, it is a third object of the present invention to provide an arithmetic processor which ca perform the arithmetic operation of exponents and detect a floating point overflow and a floating point underflow at high speed in the floating point operation by using circuit elements which are smaller in number than that of the circuit elements of the prior art processor.

Furthermore, it is a fourth object of the present invention to provide an arithmetic processor which can detect the relation in magnitude between two data at high speed.

In accordance with one aspect of the invention, a floating point processor responsive to input floating point numbers for performing floating point arithmetic operations on the input floating point numbers comprises a first arithmetic means for adding to or subtracting from a first fraction of a first floating point number, a second fraction of a second floating point number having a weight of corresponding bits equal to that of the first floating point number. The first number has an exponent larger than the exponent of the other floating point number. The second fraction is right shifted so that exponent is less than that of the first floating point number. The result of the addition or the subtraction is derived by the first means as a first output. A second arithmetic means performs the same adding or subtracting operation as the first arithmetic means performs on the first fraction and the sum of the second fraction and adds "1" to the resultant to derive a second output. An inverting means reverses every bit of the output of the second arithmetic means. A result selecting means selects the arithmetic operation from the outputs of the first and second arithmetic means and the inverter means.

According to another aspect of the invention, a floating point processor responsive to input floating point numbers for performing floating point arithmetic operations on the input floating point numbers comprises a carry generation and progagation producing means for (a) performing a first operation wherein a first fraction of a first floating point number, having an exponent larger than the exponent of the other floating point number, is added to or subtracted from a second fraction of a second floating point number having (i) a weight of corresponding bits equal to that of the first floating point number by being right shifted and (ii) an exponent less than that of the first floating point number, (b) deriving a first output that is the result of the addition or the subtraction of the first operation (c) performing the same adding or subtracting operation as performed on the first fractions and the sum of the second fraction during the first operation and adding one to the resultant and (d) deriving a second output that is the result of (c). An inverting means reverses every bit of the second output. A result selecting means selects the resultants of the arithmetic operations from the outputs of the carry generation and propagation producing means and the inverting means.

According to a further aspect of the invention, a floating point processor responsive to input signals representing floating point numbers for performing floating point arithmetic operations on the floating point numbers represented by the input signals comprises a first arithmetic means for linearly combining first and second signal values respectively representing first and second fractions of first and second floating points numbers. The first fraction has an exponent larger than the exponent of the other floating point number. The first arithmetic means shifts a second fraction of a second floating point number to cause the weight of corresponding bits of the second number to equal that of the first floating point number and (ii) the exponent of the second number to be less than that of the first floating point number. The first arithmetic means derives a first output signal representing the result of the linear combining of the first and second signal values. A second arithmetic means performs the same linear combining operation as the first arithmetic means performs on the first fraction and the sum of the second fraction and adds the resultant with "1" to derive a second output signal. An inverting means reverses every bit of the second output signal. A result selecting means selects the arithmetic operation from the output signals of the first and second arithmetic means and the inverting means.

According to still another aspect of the invention, a floating point processor responsive to input signals representing floating point numbers for performing floating point arithmetic operations on floating point numbers represented by the input signals comprises a carry generation and propagation producing means for linearly combining first and second fractions of first and second floating point numbers. The first fraction has an exponent larger than the exponent of the other floating point number. The second floating point number has a weight of corresponding bits equal to that of the first floating point number and an exponent less than that of the first floating point number. A first output signal representing the result of the linear combining of the first and second fractions is derived. The same linear combining operation as performed on the first fraction and the sum of the second fraction is added to "1." A second output signal representing the result of the operation performed on the first fraction and the sum of the second fraction and "1" is derived. An inverting means reverses every bit of the second output signal.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 3 is a truth table of a "carry for rounding" signal at an addition effected in the first embodiment of the present invention;

FIG. 4 is a truth table of a "carry for rounding" signal at a subtraction effected in the first embodiment of the present invention;

DETAILED DESCRIPTION OF THE PREFERRED EMBODIMENTS

Hereinafter, preferred embodiments of the present invention will be described in detail with reference to the drawings.

Figure 1:
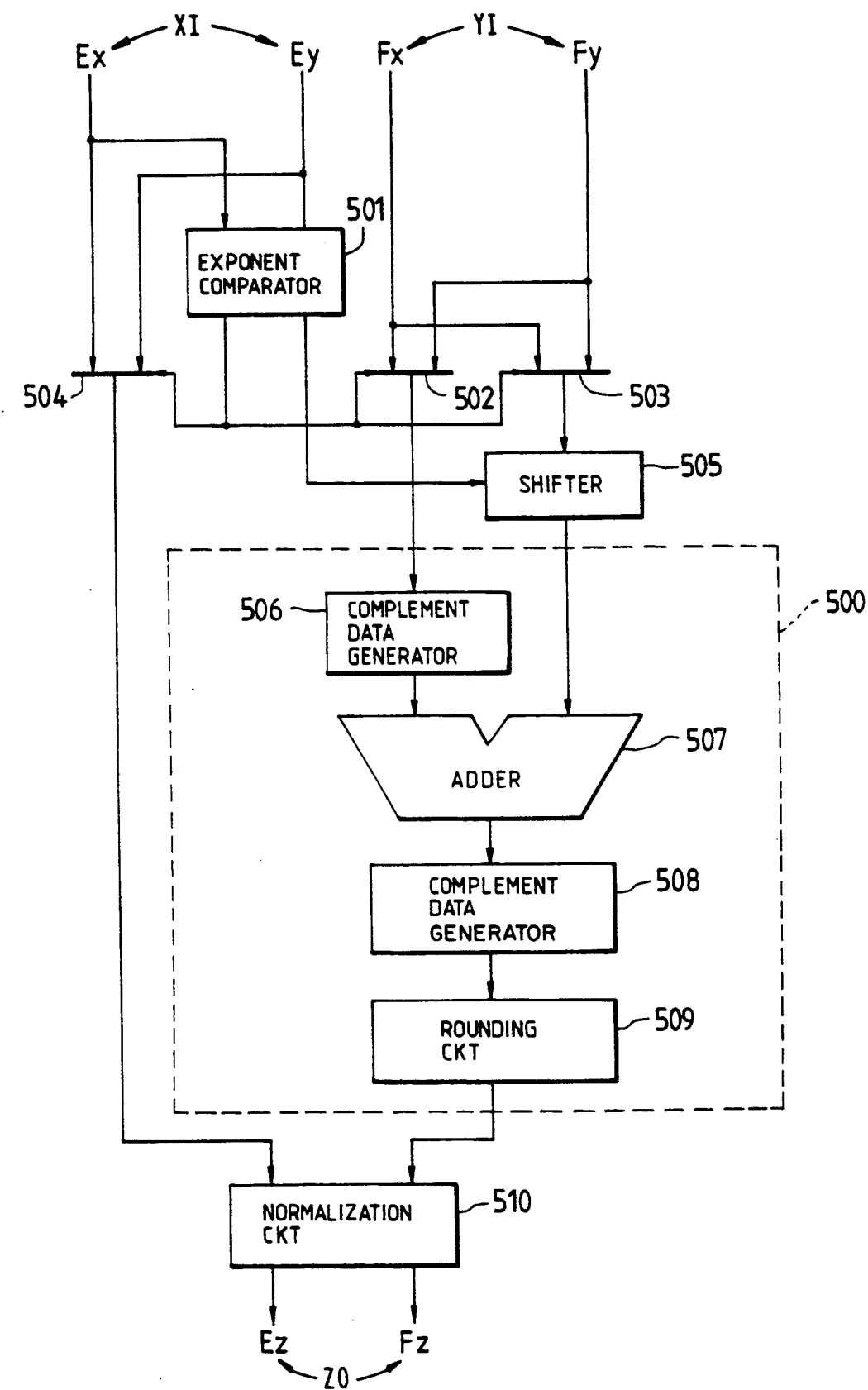
FIG. 1 is a block diagram of a conventional arithmetic processor for performing floating point operation.
Figure 2:
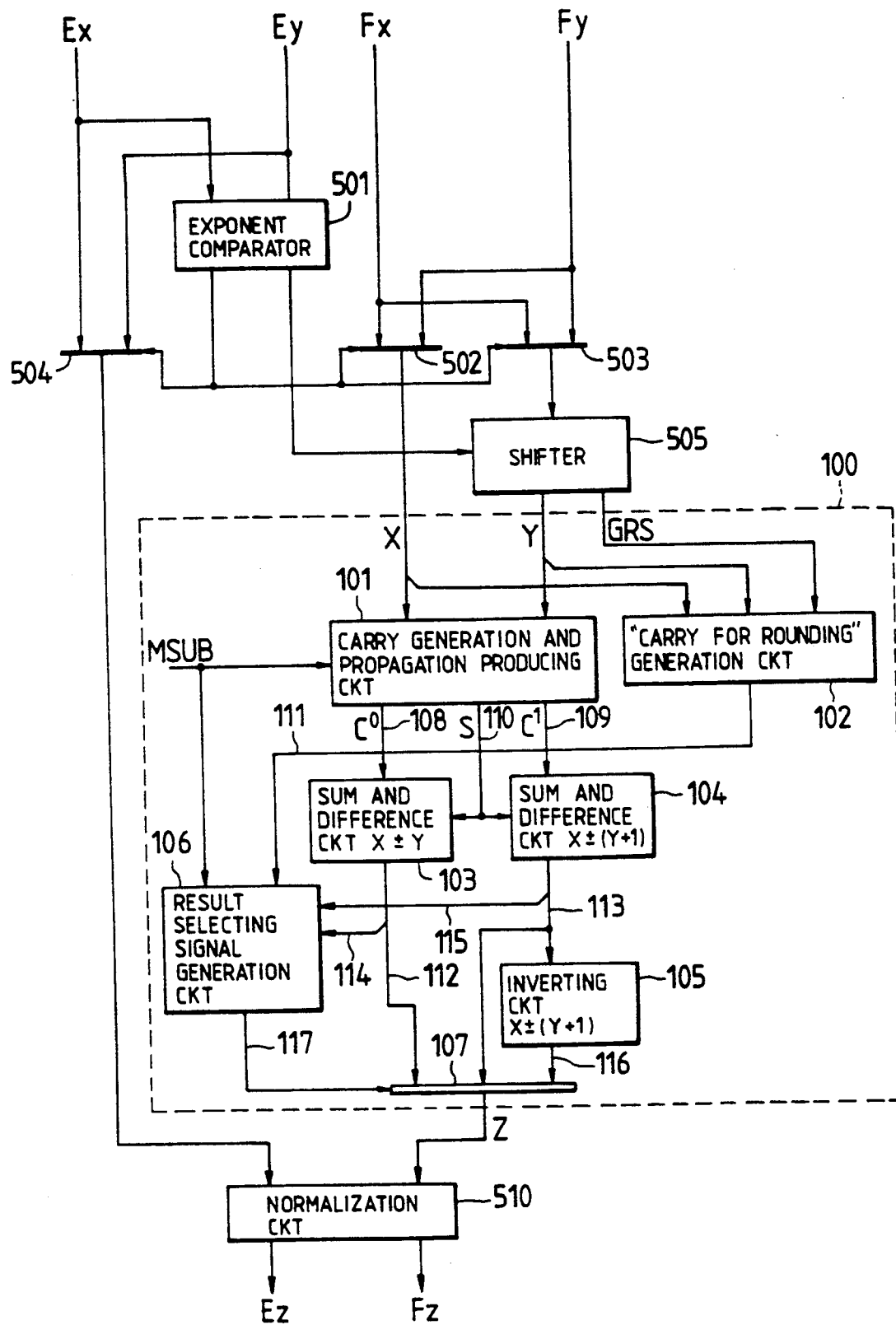
FIG. 2 is a block diagram of a first embodiment of the present invention.

FIG. 2 is a block diagram of a first preferred embodiment of the present invention. In this figure, reference numerals 501, 502, 503, 504, 505 and 510 indicate circuits similar to those indicated by the same reference numerals in FIG. 1, respectively. Circuit 100 performs arithmetic operations on fractions of data which acts as the circuit 500 for performing the arithmetic operations on the fractions shown in FIG. 1; 101 a carry generation and propagation producing circuit; 102 a "carry for rounding" generation circuit; 103 and 104 sum and difference generating circuit; 105 an reversing or inverting circuit; and 106 indicates a "result selection signal" generating circuit; 107 a selection circuit. Moreover, reference characters X indicates a fraction of data having a large exponent (hereunder referred to as an operand); Y a fraction of data having a small exponent and shifted to right (hereunder referred to as an operand); GRS a guard bit, a round bit and sticky bit (hereunder referred to simply as GRS) of the operand Y; MSUB a subtraction signal; and Z indicates the result of the operations including rounding and obtaining the absolute value of data.

First, an operation of the arithmetic circuit 100 for effecting an arithmetic operation on a fraction of FIG. 100 will be described hereinbelow. When the operand X and the operand Y are inputted into the carry generation and propagation producing circuit 101, a carry signal $C^0 108$ generated at each digit in case of addition of the fractions X and Y is obtained and another carry signal $C^0 109$ generated at each digit in case of adding the fractions X and Y when there is a carry of 1 added to the least significant bit is also obtained. On the other hand, if the arithmetic operation on the fractions is subtraction, a barrow signal $C^0 108$ generated at each digit in case of subtracting the fraction Y from the fraction X, as well as a borrow signal $C^1 109$ generated at each digit in case of subtracting the fraction Y from the fraction X when there is a borrow of 1 to the least significant bit, is obtained. Further, the borrow signals $C^0 108$ and $C^1 109$ are added to the sum and difference circuits 103 and 104. respectively. The signals $C^0$ and $C^1$ will be referred to as carry signals hereafter. The carry generation circuits for generating these carry signals can be constructed such that the most part of one of the carry generation circuits is in common with each other. Moreover, in the carry generation and propagation producing circuit 101, an intermediate sum S of the outputs of the exclusive OR of each pair of corresponding bits of the fractions X and Y is obtained. Furthermore, the "carry for rounding" generation circuit 102, part of each of the operand X and the operand Y, as well as GRS, is inputted to the "carry for rounding"

generation circuit 102, whereupon is obtained a "carry for rounding" signal 111 indicating a "carry for rounding", that is, a carry (a borrow (in case of subtraction)) to a digit corresponding to the least significant bit of the carry generation and propagation producing circuit 101, which carry is generated at a digit where rounding is effected in operations on X and Y and GRS. Further, the "carry for rounding" signal 111 is inputted to the result selecting signal generation circuit 106. Next, the sum and difference generating circuit 103 (or 104) evaluates the result 112 (or 113) of an operation on the fractions X and Y, that is, (X±Y) (or X±(Y+1) in case that a carry or borrow has occurred to the least significant bit) from the carry signals $C^0$108 (or $C^1$109) and the exclusive OR of each pair of the corresponding bits thereof at each digit, which are obtained in the carry generation and propagation producing circuit 101. The results of the operations are inputted to the selection circuit 107. Only the result 113 of the operation X±(Y+1) is also inputted to the inverting circuit 105. The data at two bits 114 and 115 of higher order including the overflows occurred in the results of these operations are inputted to the result selecting signal generation circuit 106. Further, the inverting circuit 105 evaluates the result 116 of the operation $\overline{X\pm(Y+1)}$ by reversing each bit of the result 113 of the operation X±(Y+1). The obtained result 116 of the operation $\overline{X\pm(Y+1)}$ is added to the contents of the selection circuit 107. Furthermore, the value of the result 116 of the operation $\overline{X\pm(Y+1)}$ is equal to the value of −(Y−Y) obtained by reversing the sign of the X—Y in case the arithmetic operation is a subtraction. Finally, a selection signal 117 for selecting an appropriate result from the results 112, 113 and 116 is generated in response to the "carry for rounding" signal 111 obtained in the "carry for rounding" signal generation circuit 102, the two bits 114 and 115 of higher order of the result of the operation and the subtraction signal MSUB. The appropriate result is selected by the selection circuit 107 and further the result Z of the arithmetic, rounding operations and obtaining the absolute value thereof is outputted.

Next, each of the circuits will now be specifically described. First, the carry generation and propagation producing circuit 101 is a circuit for obtaining a carry $C^0$ generated at each digit in case of the addition or subtraction of two data X and Y inputted to this circuit and another carry $C^1$ generated at each digit in case of the addition or subtraction of the two data X and Y when there is a carry in the least significant bit.

In the following description, the number of digits of inputted data is assumed to be n (n is a positive integer) and the input data X and are assumed to be as follows:

$X = x_{n-1} \ldots x_1 x_0$; and $Y = y_{n-1} \ldots y_1 y_0$.

First, a carry generation function $g_{i,j}$ and a carry propagation function $p_{i,j}$ will be described hereinbelow. Here, it is assumed that $i \geq j$. Further, $g_{i,j}$ means that if an addition or a subtraction is effected from the j-th to the i-th bit, a carry or a borrow to a bit of higher order is generated. On the other hand, $p_{i,j}$ means that if an addition or a subtraction is effected from the j-th to the i-th bit, a carry or a borrow is propagated to a higher order bit when a carry or a borrow from a bit of lower order occurs. (Hereunder, for simplicity of description, only the term "carry" is used in the description even in case that it is applicable to a borrow.) From these definitions, the carry generation function $g_{i,j}$ and the carry propagation function $p_{i,j}$ of each digit are given by using the values $x_i$ and $y_i$ of each digit of the input data as follows:

$$g_{i,i} = (MSUB \oplus x_i) \cdot y_i \qquad (1)$$
$$p_{i,i} = (MSUB \oplus x_i) \oplus y_i \qquad (2a)$$
or
$$= (MSUB \oplus x_i) + y_i \qquad (2b)$$

where MSBU indicates a subtraction signal of which the value is "1" in case that the arithmetic operation to be effected is subtraction and "0" in case that the arithmetic operation to be effected is addition. As described above, $p_{i,i}$ can be represented by either of the representations (2a) and (2b). This is because, if a carry from a digit concerned to a higher order digit is generated, there are two cases that a carry is included in the carry propagation and that a carry is not included in the carry propagation. Either of these representations can be used in generating a carry.

In case where $i \geq j \geq k$, the following equations hold for such i, j and k:

$$g_{i,ki} = g_{i,j} + p_{i,j} g_{j-1,k} \qquad (3)$$

$$p_{i,k} = p_{i,j} p_{j-i,k} \qquad (5)$$

From these equations (1) thru (4) above, the carry generation functions $g_{i,k}$ and the carry propagation functions $p_{i,k}$ from the k-th digit, which is a reference digit, to the i-th digit can be obtained. That is, the values of the carry generation function $g_{i,i}$ and the carry propagation function $p_{i,i}$ of each digit itself as represented by the equations (1) and (2) are first obtained from the data of each digit at which an operation is performed. Further, the carry generation function and the carry propagation function of each of the digits from a reference digit to a concerned digit can be obtained by iteratively applying the equations (3) and (4). Taking addition or subtraction performed at each of the bits from the reference bit to the concerned bit into considerations by using the above-described definitions of the carry generation function and the carry propagation function, the carry generated at the i-th digit is given by the following equation:

$$c_i = g_{i,j} + p_{i,j} c_{j-i} \qquad (5)$$

Moreover, in case where j=0 in the equation (5), the carry is given by $$c_i = g_{i,o} + p_{i,o} \cdot c_{-1} \qquad (6)$$

where $c_{-i}$ indicates a carry to the least significant digit. If $c_{-i}$ is "0", a carry $c^0{}_1$ from each digit in the operation X±Y can be obtained. Further, if $c_{-1}$ is "1", a carry $c^1{}_i$ from each digit in the operation X±(Y+1) can be obtained. In the configuration of circuits for generating carry signal $C^\square$ and $C^1$, the parts for generating the carry generation function $g_{i,j}$ and the carry propagation function $p_{i,j}$ can be implemented by the same circuit and thus the most part of the circuits is used in common. Therefore, only the parts for generating the carries are made independently with each other. Further, in the carry generation and propagation producing circuit 101, the interim or temporary sum S is obtained by computing the exclusive OR of each pair of the corresponding bits of the input data X and Y. Namely, the i-th bit $s_1$ of the interim sum S is represented by $$s_I = x_I \oplus y_I \quad (7)$$

This interim sum $S_i$, as well as the carries $C^0{}_1$ and $C^1{}_1$ is used to evaluate a final sum of the operation.

Next, the sum and difference generating circuits 103 and 104 are described in detail. These circuits are used to obtain the results of the arithmetic operations $(X \pm Y)$ and $\{X \pm (Y+1)\}$ from the carries $C^0$ and $C^1$ generated at the time of operations of the input data X and Y and the interim sum S. For example, the i-th bit $z^0{}_i$ of the result of the operation $(X \pm Y)$ is obtained by the following equation from the carry $c^0{}_{i-1}$ in case that the carry $c_{-1}$ to the least significant digit is "0".

$$\begin{aligned} z_i{}^0 &= x_i \oplus y_i \oplus c^0_{i-1} \\ &= s_i \oplus c^0_{i-1} \end{aligned} \quad (8)$$

Moreover, the i-th bit $z^1{}_i$ of the result of the operation $X \pm (Y \pm 1)$ is obtained by the following equation from the carry $c^1{}_{i-1}$ to the i-th digit in case the carry $c_{-1}$ to the least significant bit is "1".

$$\begin{aligned} z_i{}^1 &= x_i \oplus y_i \oplus c^1_{i-1} \\ &= s_i \oplus c^1_{i-1} \end{aligned} \quad (9)$$

Furthermore, the "carry for rounding" generation circuit 102 will now be described in detail. This circuit is used to obtain a "carry for rounding" signal 111, that is, a signal indicating a carry to a digit corresponding to the least significant bit of the carry generation and propagation producing circuit 101 which signal is generated when the addition (or subtraction) and the rounding is performed at the digit, at which the rounding is to be effected, in the operation on the input data including X, Y and GRS in response to signals indicating part of lower order bits of the input data X and Y and GRS.

The rounding will now be described. The operand X is the fraction of the input data of which the exponent is larger than that of the other data Y and the value of the normalized fraction. Therefore, there are two digit positions at which the rounding may be effected when the addition is performed. That is, one of the digits is the digit place where no overflow results from the addition and the other is the digit place where an overflow results from the addition. When no overflow occurs, the rounding is to be effected at the digit place one bit below the least significant bit of the input data X that is, at the guard bit. On the other hand, when an overflow occurs, the rounding is to be effected at the least significant bit of the data X. Similarly, in case of subtraction, there are two digit positions where rounding may be performed. In case no overflow occurs in the result, that is, the result of the subtraction is positive and the most significant bit of the subtraction result is 1, rounding is performed at the guard bit. Further, if the result of the subtraction is positive and the most significant bit of the result is 0, rounding is performed at the round bit. At that time, there is a case that more than one digit from the most significant bit of the result in 0. Such result of the subtraction is obtained only in case the data exponents are equal to each other or different by one and thus the values at the digit places, which are the same with or below the round bit, are 0. Therefore, in such a case, the processor has only to round the data at the round bit. There is another case of an overflow occurring in the subtraction result, that is, the subtraction result is negative. This occurs only if the data exponents are equal. Thus, the values at the digit places, which are the same with or below the guard bit, are 0. Therefore, in such a case, there is no need to round. As can be understood from the foregoing description, there are three digit places (hereunder sometimes referred to simply as "digit places for rounding"), where rounding is to be performed, (1) in the addition and subtraction operations that is, the least significant bit of the result, (2) the guard bit and (3) the round bit. There are several rounding methods. For instance, four modes of rounding, that is, "rounding to nearest", "round toward $+\infty$", "round toward $-\infty$" and "round toward 0" are prescribed in the IEEE 754 Floating Point Arithmetic Standard. Therefore, the processor must only obtain the "carry for rounding" signals corresponding to the "digit places for rounding" and the modes of rounding. For example, the "round to nearest" mode, the mode often employed in the processor, is described in detail herein. The "round to nearest" method is devised such that the result of rounding the data according to this method becomes nearest to the accurate result. Thus, if there are two values nearest to the accurate result, the least significant bit of the result of the rounding pursuant to this method is set to be 0. If the "carry for rounding" is that to the least significant bit of the data X, the "carry for rounding" according to this method is effected by using the truth table of FIG. 3 in case of addition, or the truth table of FIG. 4 in case of subtraction. In these truth tables, $z^\square{}_1$ $_{land}$ $z^0{}_0$ indicate the values of two bits from the least significant bit of the result of the operation on the data X and Y, respectively. Further, $y_G$, $y_R$ and $Y_S$ indicate the values at the guard bit, the round bit and the sticky bit, respectively. Moreover, $y_R + y_S$ indicates the logical OR of $y_R$ and $y_S$. Further, CRU denotes a "carry for rounding" signal corresponding to the rounding effected at the least significant bit, that is, the bit $z^0{}_0$; CRM another "carry for rounding" signal corresponding to the rounding effected at the guard bit, that is, the bit $y_G$; and CRL still another "carry for rounding" signal corresponding to the rounding effected at the round bit, that is, the bit $y_R$. Further, in case of the subtraction, "−1" means a borrow of 1. The "carry for rounding" indicated by the CRU in case of addition is determined such that the result of effecting the rounding at the least significant bit, that is, the bit $Z^0{}_0$ coincides with that of effecting the "carry for rounding" to the least significant bit t every bit which is higher order than the bit $z^0{}_1$. Thus, the digit $z^0{}_0$ is not necessary as the rounded result and may be either 0 or 1. Therefore, there occur cases (indicated by the asterisks * in FIG. 3) that the value indicated by the signal CRU may be either 0 or 1. As can be understood from these two truth tables, the carry or borrow to the least significant bit, which is caused by the rounding is 1 at most. When the result is positive, the value of the part composed of the bits having the same or higher order than the least significant bit, of the result after rounding can be only the value of the operation $X \pm Y$ or $X \pm (Y+1)$. The "carries for rounding" CRU, CRM and CRL in cases of addition and subtraction are obtained from these truth tables as follows:

First, in case of addition, $$CRU = x_1 \oplus y_1 + y_G + y_R + y_S \quad (10)$$

$$CRM = y_G(x_0 \oplus y_0 + y_R + y_S) \quad (11)$$

Further, in case of subtraction, $$CRM = y_G(x_0 \oplus y_0 + y_R + y_S) \quad (12)$$

$$CRL = y_G + y_R \cdot y_S \quad (13)$$

As can be understood from comparison between the equations (11) and (12), the "carry for rounding" CRM can be represented by the same signal in cases of both of addition and subtraction. Thus, the processor has only to produce only three signals.

Next, in case that the result of the subtraction is negative, which occurs only when the two exponents are equal to each other, all of the guard bit, the round bit and the sticky bit are 0 and thus these is not necessity of rounding. The fraction of the result of the operation should be represented by the absolute value thereof and therefore the absolute value of the fraction should be computed when the result of the operation is negative. The value obtained by reversing the sign of the result of the subtraction $(X-Y)$ can be found by evaluating the reverse $\overline{X-(Y+1)}$ of all of the bits of $\{X-(Y+1)\}$. Generally, the value obtained by reversing the sign of data A is computed by obtaining the two's complement of the data, that is, by reversing all of the digits of the data and further adding 1 to the least significant bit of the data. Namely, the following equation holds in general.

$$-A = \overline{A} + 1 \quad (14)$$

Thus, by using the relation expressed by the equation (14), the following equation can be modified as follows.

$$\begin{aligned}
-(X-Y) &= -(X-Y-1) - 1 \\
&= \overline{(X-Y-1)} + 1 - 1 \\
&= \overline{X-(Y+1)}
\end{aligned} \quad (15)$$

This proves that the value obtained by reversing the sign of the result of the subtraction $(X-Y)$ is found by reversing all of the bits of $\{Y-(Y+1)\}$, as above described. The inverting circuit 105 is used to obtain the reverse $\overline{X-(Y+1)}$ of all of the bits of $\{X-(Y+1)\}$. It can be determined by the overflow signal generated at the time of the subtraction on the data X and Y whether or not the result of the subtraction $(X-Y)$ is negative. Namely, if the overflow is 1, the result of the subtraction $(X-Y)$ is negative and as a consequence the circuit 105 has only to output the value of the reverse $\overline{X-Y(Y+1)}$. On the other hand, if the overflow is 0, the result of the subtraction $(X-Y)$ is positive and consequently the circuit 105 has only to output the value of $(X-Y)$.

Finally, the result selecting signal generation circuit 106 will be detailed described hereinbelow. This circuit is provided to generate a signal for selecting the result of an operation on data, of which the absolute value is obtained and rounded, from the outputs of the sum and difference generating circuits 103 and 104 and the inverting circuit 105. First, in case that the output of the inverting circuit 105 is selected, which occurs only when the arithmetic operation on the fractions is subtraction and the value of $(X-Y)$ is negative, that is, the overflow $RC^0$ of the result of the operation $(X-Y)$ is 1. Thus, a signal $SL_2$ for selecting the output of the inverting circuit 105 is represented by $$SL_2 = MSUB \cdot RC^0 \quad (16)$$

Further, a signal $SL_1$ for selecting the outputs $\{X \pm (Y+1)\}$ of the sum and difference generating circuit 104 is represented as follows:

$$SL_1 = \overline{SL_2} \cdot [\overline{MSUB} \cdot \{CRM \cdot (RC^1 \cdot CRU + \overline{RC^1}) + \quad (17)$$

$$\overline{CRM} \cdot RC^0 \cdot CRU\} + MSUB \cdot \{CRL \cdot (S_M^1 \cdot CRM + \overline{S_M^1}) +$$

$$\overline{CRL} \cdot S_M^0 \cdot CRM\}]$$

where $RC^1$ and $S^1_M$ indicate the overflow and the most significant bit of $\{X \pm (Y+1)\}$, respectively. Further, $RC^0$ and $S^0_M$ indicate the overflow and the most significant bit of $(X \pm Y)$, respectively. The equation (17) means the following matters. That is, the operations on the fractions are effected except in case that the output of the inverting circuit 105 is selected. Further, an appropriate one of two round bits is determined on the basis of the overflow signal when rounded at a bit of lower order. When the value indicated by the "carry for rounding" signal corresponding to the appropriate round bit is 1, the result of $\{X \pm (Y+1)\}$ is selected. Moreover, by simplifying the equation (17), the following equation is obtained:

$$SL_1 = \overline{SL_2} \cdot [\{\overline{MSUB} \cdot (CRM \cdot CRU + \quad (18)$$

$$CRM \cdot \overline{RC^1} + RC^0 \cdot CRU)\} +$$

$$\{MSUB \cdot (CRL \cdot CRM + CRL \cdot \overline{S_M^1} + S_M^0 \cdot CRM)\}]$$

Furthermore, the following equations are obtained from the equations (10) to (13):

$$CRU \cdot CRM = CRM \quad (19)$$

$$CRM \cdot CRL = CRM \quad (20)$$

Thus, the equation (18) is further simplified as follows:

$$SL_1 = \overline{SL_2} \cdot (\overline{CRM} + \overline{MSUB} \cdot RC^0 \cdot CRU + M\text{-} \quad (21)$$
$$SUB \cdot CRL \cdot S^1_M)$$

On the other hand, the signal $SL_o$ for selecting the output $(X \pm Y)$ of the sum and difference generating circuit 103 is represented as follows:

$$\begin{aligned}
SL_o &= \overline{SL_1 + SL_2} \quad (22) \\
&= SL_2 + CRM + \overline{MSUB} \cdot RC^0 \cdot \\
&\quad CRU + \overline{MSUB} \cdot CRL \cdot \overline{S^1_m}
\end{aligned}$$

Further, the logic of the result selecting signals $SL_0$, $SL_1$ and $SL_2$ can be represented by logic expressions other than the equations (16), (21) and (22).

In the above described way, the final result is obtained through the operations on the fractions, the rounding operations and the operations for obtaining the absolute value of the rounded value. The conventional processor of FIG. 1 requires the carry generation and propagation producing circuits each of which includes a large number of circuit elements and is provided for at least each of the adder 507 and the rounding circuit 509, while the processor of the present invention needs only one carry generation and propagation producing circuit and thus can save significantly the circuit elements. Further, the arithmetic processor of the present invention can perform the operations on input data, the rounding of the results of the operations and the operation of obtaining the absolute value of the rounded results by effecting addition or subtraction only one time, thereby performing such arithmetic operations at high speed.

Figure 5:
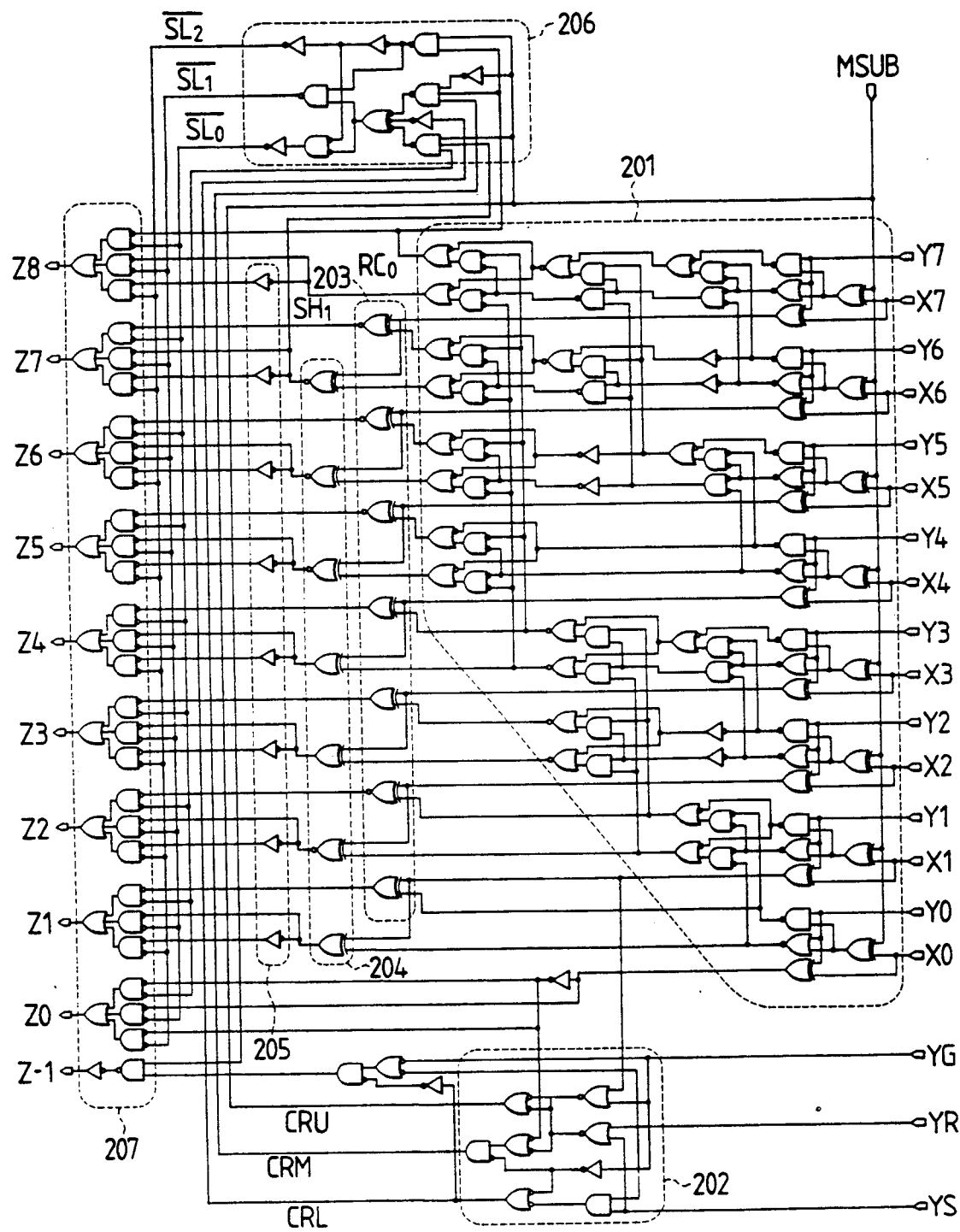
FIG. 5 is a diagram of the logic circuit of the first embodiment of the present invention implemented by employing CMOS circuits.

FIG. 5 shows the concrete constructions of a logic circuit which is a first preferred embodiment of the present invention, in case that the number of digits of the fraction of the input data is 8. In this figure, reference numeral 201 indicates a carry generation and propagation producing circuit; 202 a "carry for rounding" circuit; 203 and 204 sum and difference generating circuits; 205 an inverting circuit; 206 a result selecting signal generation circuit; and 207 a selection circuit. These circuits 201, 202, 203, 204, 205, 206 and 207 correspond to the circuits 101, 102, 103, 104, 105, 106 and 107 of FIG. 2, respectively. In the logic circuit of FIG. 5, one additional bit $z_{-1}$ is consequently added to the least significant bit of the data when the result is rounded at the round bit and the subtraction is effected and the most significant bit is 0. The output of this least significant bit is obtained from $y_G$, $y_R$ and $y_S$. In this way, the arithmetic processor of the present invention can be perform arithmetic at high speed by using a small number of logical gate circuits and logical stages.

Figure 6:
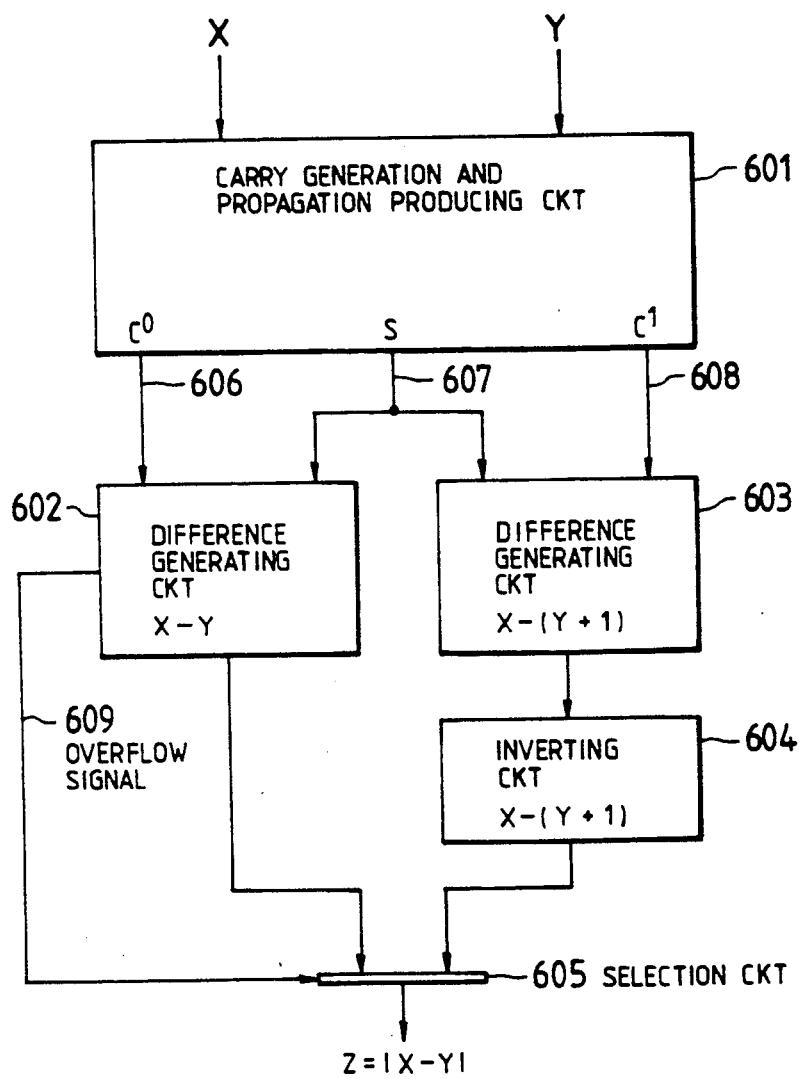
FIG. 6 is a block diagram showing a second embodiment of the present invention.

FIG. 6 is a block diagram showing a second preferred embodiment of the present invention. Further, the function of the circuit of FIG. 6 is to output the absolute value of the difference between the inputted two data. In this figure, reference numeral 601 designates a carry generation and propagation producing circuit; 602 and 603 difference generating circuits; 604 an inverting circuit; and 605 a selection circuit. Further, reference characters X and Y indicate inputted data; and Z the output data of the absolute value of $(X-Y)$.

Operation of the circuit of FIG. 6 is now described in detail. Input data X and Y are supplied to the carry generation and propagation producing circuit 601. Circuit 601 derives a carry $C^0$ 606 (which is generated for each bit for a subtraction operation on data X and Y), a carry $C^1$ 608 (which is generated for each bit for a subtraction operation on data X and Y when there is a carry of the least significant bit) and an interim sum S representing the exclusive OR of every pair of corresponding bits of data X and Y. In the difference generating circuit 602, the value of $(X-Y)$ is obtained from the carry $C^0$606 and the interim sum S. On the other hand, in the difference generating circuit 603, the value of $\{X-(Y+1)\}$ is evaluated from the carry $C^1$608 and the interim sum S. Further, the inverting circuit 604 obtains the value of $\{\overline{X-(Y+1)}\}$ by reversing every bit of $\{X-(Y+1)\}$ obtained by the difference generating circuit 603. This value of $\{\overline{X-(Y+1)}\}$ represents the value of $-(X-Y)$ as described as to the equation (15). The selection circuit 605 selects the output $(X-Y)$ of the difference generating circuit 602 or the output $\{\overline{X-(Y+1)}\}$ of the inverting circuit 604 in accordance with the overflow signal 609 outputted from the difference generating circuit 602 and outputs the absolute value of Z $(=|X-Y|)$. If the value indicated by the overflow signal 609 is "0", the value of $(X-Y)$ is positive and the output $(-Y)$ of the difference generating circuit 602 is selected. On the other hand, if the value indicated by the overflow signal 609, the value of $(X-Y)$ is negative and the output $\{\overline{X-(Y+1)}\}$ of the inverting circuit 604 is selected.

As above described, the carry generation and propagation producing circuit 101 obtains the carry $C^0$ generated at each digit in case of effecting the addition or the subtraction operation on the inputted data X and Y and further obtains the carry $C^1$ generated at each digit in case of effecting the addition or the subtraction operation on the data X and Y. In contrast, the carry generation and propagation producing circuit 601 is used to obtain the carry $C^0$ generated at each digit in case of effecting the subtraction between the inputted data X and Y and further obtains the carry $C^1$ generated at each digit in case of effecting the subtraction between the data X and Y when the carry to the least significant bit. Therefore, as is apparent if 1 is substituted for the value indicated by the signal MSUB in the equations (1) and (2), the carry generation and propagation producing circuit 601 is constructed in the manner similar to the construction of the circuit 101 shown in FIG. 2. Further, the difference generating circuits 602 and 603 are constructed in the similar manner as the corresponding circuits shown in FIG. 2. Further, in the foregoing description, the processor of the present invention for outputting the absolute value of the difference have been described. However, by the opposite selection, the processor of the present invention can output the two's complement of the absolute value of the difference. Moreover, in the foregoing description, the configuration for selecting the result of the operations in accordance with the overflow signal 609 outputted from the difference generating circuit 602 have been described. It is, however, apparent to those skilled in the art that the circuit of the present invention can be altered to effect the similar selection in accordance with the overflow signal outputted from the difference generating circuit 603.

Figure 7:
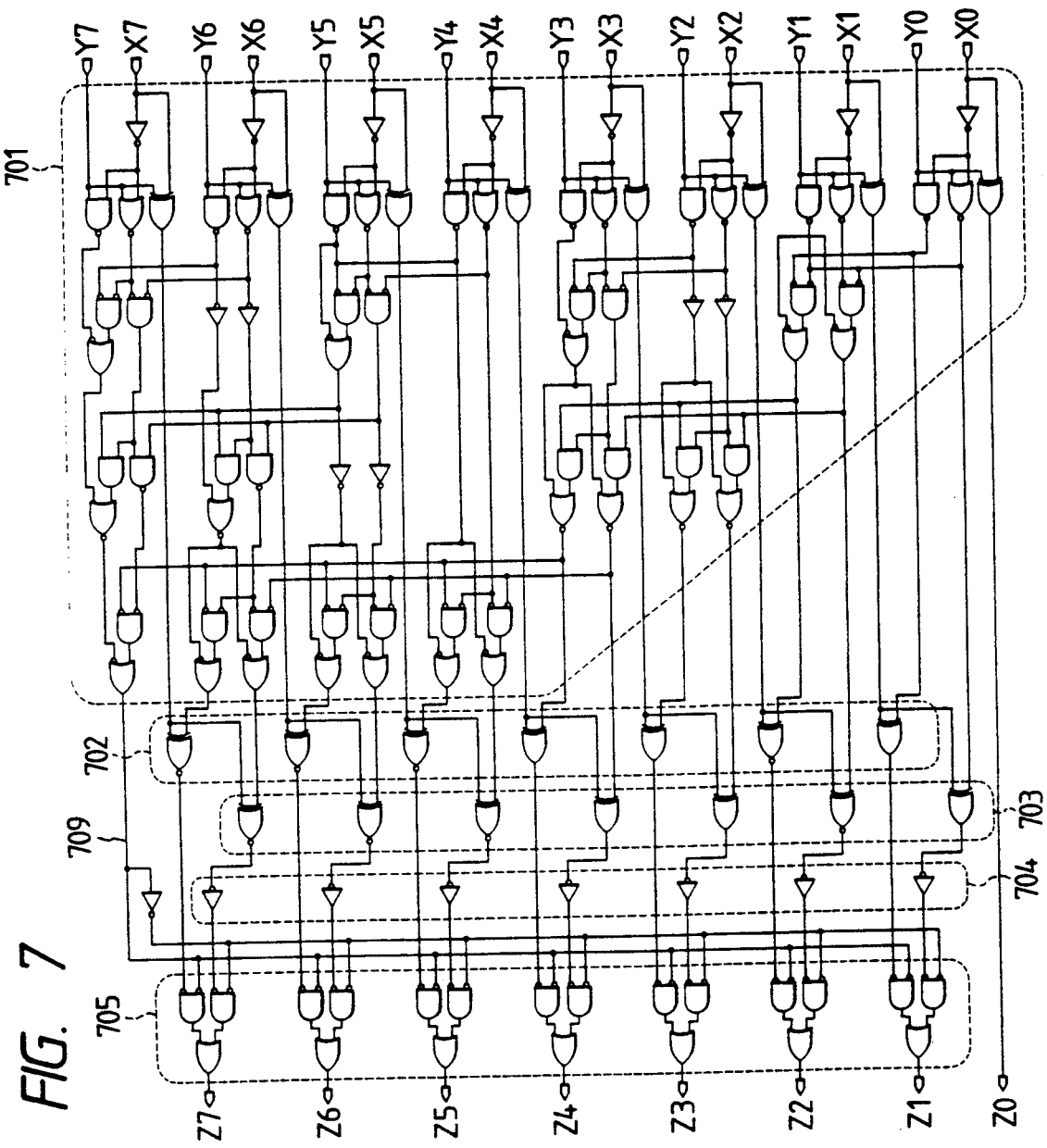
FIG. 7 is a diagram of the logic circuit of the second embodiment of the present invention implemented by employing CMOS circuits.

FIG. 7 shows the concrete construction of a logic circuit which is a second preferred embodiment of the present invention, in case that the number of digits of the fraction of the input data is 8. In this figure, reference numeral 701 indicates a carry generation and propagation producing circuit; 702 and 703 difference generating circuits; 704 an inverting circuit; 705 a selection circuit; and 709 an overflow signal. These circuits and signal 701, 702, 703, 704, 705 and 709 correspond to the circuits and signal 601, 602, 603, 604, 605, and 609 of FIG. 6, respectively. In the circuit of FIG. 7, the overflow signal 709 is outputted from the carry generation and propagation producing circuit 6701. This is because the signal indicating the carry from the most significant bit is the same with the overflow signal in this circuit.

Figure 8:
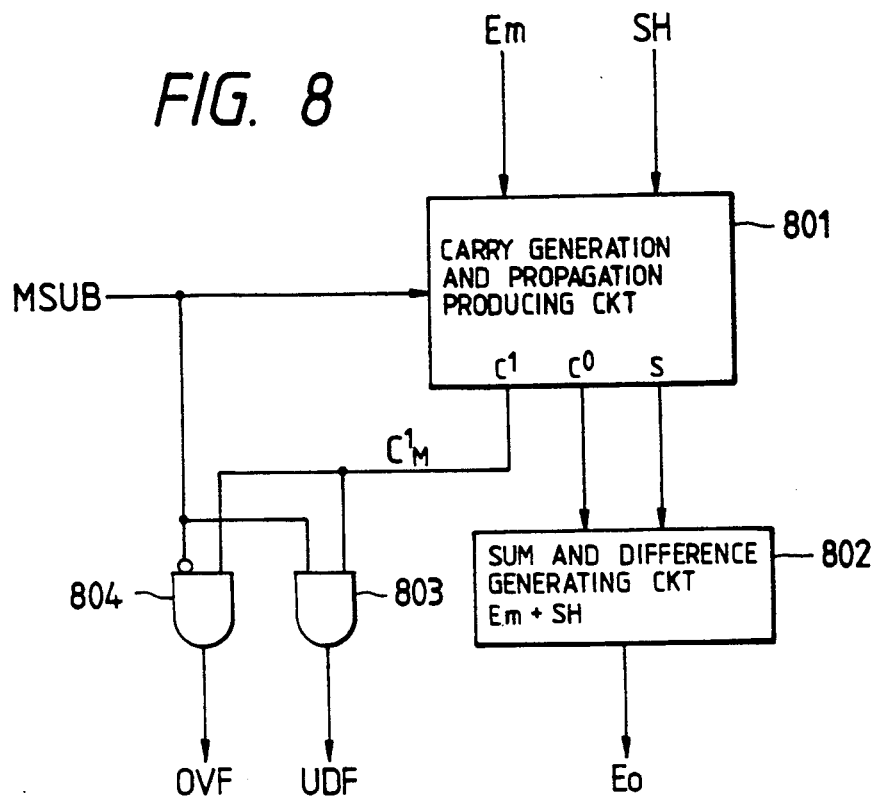
FIG. 8 is a block diagram of a third embodiment of the present invention.

FIG. 8 is a block diagram showing a third embodiment of the present invention. The function of the circuit shown in FIG. 8 is to detect the final normalized result of the operation on the exponents in case of effecting the addition or subtraction of floating point data. In this figure are included carry generation and propagation producing circuit 801; sum and difference generating circuit 802; a floating point underflow detecting circuit 803; and a floating point overflow detecting circuit 804. Further, reference character Em indicates the exponent of one of the floating point data, which is larger than the of the other of the floating a point data;

SH the absolute value of the amount of the shift to right or left for the purpose of normalization of the interim result of the fraction; MSUB a subtraction signal; $C^1{}_M$ an overflow signal; $E_o$ the result of operations on the exponent; UDF a floating point underflow detecting signal; and OVF a floating point overflow detecting signal. The carry generation and propagation producing circuit 801 and the sum and difference generating circuit 802 are similar in construction to the carry generation and propagation producing circuit 101 and the sum and difference generating circuit 103, respectively. Operation of the embodiment of FIG. 8 is now briefly described. Exponent EM and the amount SH of the shift are inputted to the carry generation and propagation producing circuit 801. Then, subtraction signal MSUB signals whether an addition or subtraction operation is to be performed. The overflow signal $C^1{}_M$ of the operation $\{Em \pm (SH+1)\}$, the carry $C^0$ to each bit of the operation $(Em \pm SH)$ and the interim sum S are obtained. Next, a floating point underflow is detected by the floating point underflow detecting circuit 803 on the basis of the overflow signal $C^1{}_M$ and the subtraction signal MSUB when the arithmetic operation to be performed is subtraction and the value indicated by the overflow signal $C^1{}_M$ is "1". If a floating point underflow is detected, the floating point underflow signal UDF is outputted by the circuit 803. Further, a floating point overflow is detected by the floating point overflow detecting circuit 804 on the basis of the overflow signal $C^1{}_M$ and the subtraction signal MSUB when the arithmetic operation to be performed is addition and the value indicated by the overflow signal $C^1{}_M$ is "1". If a floating point overflow is detected, the floating point overflow signal OVF is outputted by the circuit 804. Simultaneously, the result of the operation $(Em \pm SH)$ is obtained using the carry $C^0$, which is obtained when the carry $C_{-1}$ to the least significant is "0"; and outputted as the result $E_o$ of the operation on the exponent by the sum and difference generating circuit 802.

Detection of a floating point underflow or a floating point overflow is derived in response to overflow signal $C^1{}_M$ and the subtraction signal MSUB. If Em is the exponent of the ordinary normalized floating point data, a floating point overflow and a floating point underflow in every result of arithmetic operations on the floating point data can be detected on the basis of the overflow signal $C^1{}_M$. As described above, a floating point overflow occurs when the following relation holds:

$$Em + SH \geq 2^n - 1.$$

That is, $$Em + SH + 1 \geq 2^n.$$

Thus, the value at the $(n+1)$-th bit is and accordingly the value indicated by the overflow signal $C^1{}_M$ is "1". On the other hand, a floating point underflow occurs when the following relation holds:

$$Em - SH \leq 0.$$

That is $$Em - (SH+1) \leq -1.$$

Therefore, in this case, the value at the $(n+1)$-th bit indicating the sign is and thus the value indicated by the overflow signal $C^1{}_M$ is "1". Thus, when the arithmetic operation to be performed is subtraction and the overflow signal $C^1{}_M$ indicates "1", a floating point underflow is detected and the floating point underflow signal UDF is outputted. Further, when the arithmetic operation to be performed is addition and the overflow signal $C^1{}_M$ indicates "1", a floating point overflow is detected and the floating point overflow signal OVF is outputted.

Figure 9:
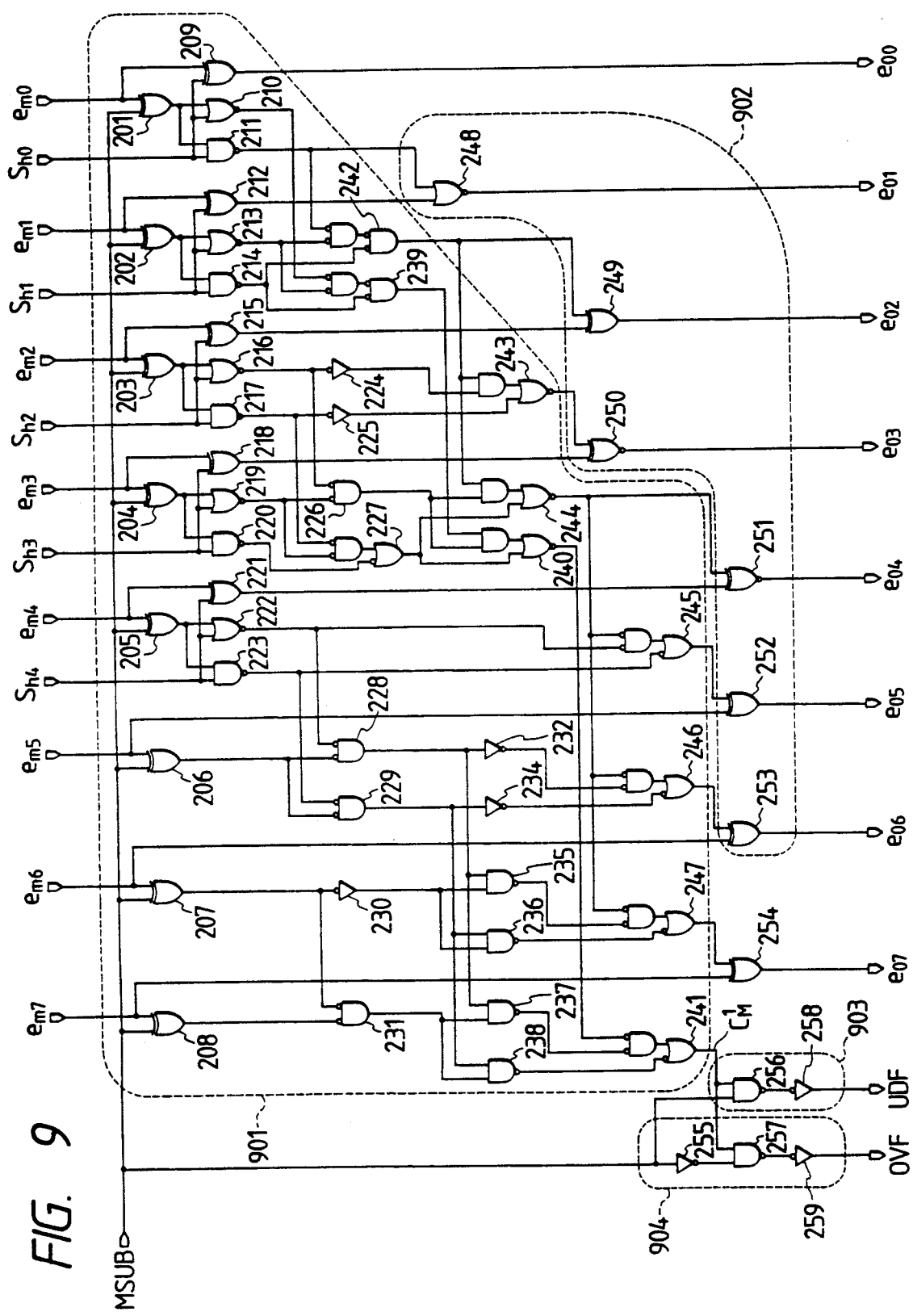
FIG. 9 is a diagram of the logic circuit of the third embodiment of the present invention implemented by employing CMOS circuits.

FIG. 9 is a circuit diagram of another preferred embodiment of the present invention implemented by employing CMOS circuits in case that the number of bits of the exponent of the input data is set to be 8, that is, in case of single-precision prescribed in the IEEE 754 Floating Point Arithmetic Standard. In this figure, reference numeral 901 indicates a carry generation and propagation producing circuit; 902 a sum and difference generating circuit; 903 an underflow detecting circuit; and 904 an overflow detecting circuit. Further, the circuits 901, 902, 903 and 904 correspond to the circuits 801, 802, 803 and 804, respectively. Input data includes a part $e_{mi}$ ($0 \leq i \leq 7$) of 8 bits which is an exponent part and another part $sh_i$ ($0 \leq i \leq 4$) of 5 bits which indicates the amount of shift. Further, the subtraction signal SUB is inputted to the circuit of this embodiment. Moreover, a signal indicating the result $e_{oi}$ ($0 \leq i \leq 7$) of the operation on the exponent, a floating point underflow signal UDF and an floating point overflow signal OVF are outputted. As described above, the data of the amount of shift has only 5 bits because the result of the operation on the rounded fraction can be represented by 24 bits and thus the amount of shift for normalization can be fully represented by only 5 bits.

The arithmetic operation of modifying the exponent and the detection of an underflow and an overflow are performed in the above described manner in this embodiment of the present invention. Thus, only by adding a simple circuit to the device for effecting arithmetic operations on the exponent, this embodiment of the present invention can output the floating point underflow signal and the floating point overflow signal at high speed before the result of the operation on the exponent is obtained.

Figure 10:
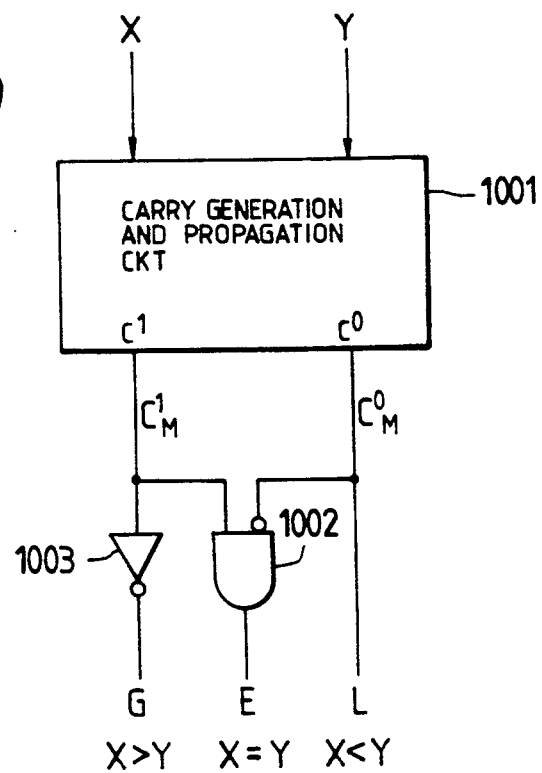
FIG. 10 is a block diagram of a fourth embodiment of the present invention.

FIG. 10 is a block diagram showing a fourth embodiment of the present invention. The function of the circuit shown in this figure is to detect the relation in magnitude between inputted two data. Further, in this figure, reference numeral 1001 indicates a carry generation and propagation producing circuit; and 1002 and 1003 gates. Moreover, in this circuit, reference character X indicates a minuend of the two input data; Y a subtrahend of the two input data; $C^0{}_M$ an overflow signal produced at the time the subtraction $(X-Y)$ in case that the carry to the least significant bit is "0"; $C^1{}_M$ an overflow signal produced at the time of the subtraction $(X-Y)$ in case that the carry to the least significant bit is "1"; E a terminal for outputting a detection signal indicating that the input data X and Y are equal to each other; L another terminal for outputting a signal indicating that the data X is less than the data Y; and G still another terminal for outputting a detection signal indicating that the data X is greater than the data Y. The carry generation and propagation producing circuit 1001 and gates 1002 and 1003 of FIG. 10 act in the manner similar to the circuits 101, 103 and 104 of FIG. 2 do, respectively.

Next, an operation of this embodiment of FIG. 10 will be briefly described hereunder. First, the minuend X and the subtrahend Y are inputted to the carry generation and propagation circuit 1001. Thereafter, in case that the arithmetic operation is subtraction between the data X and Y and further the carry to the least significant bit is "0", the overflow signal $C^0_M$ in case of the subtraction $(X-Y)$ is generated. On the other hand, in case that the arithmetic operation is subtraction between the data X and Y and further the carry to the least significant bit is "1", the overflow signal $C^1_M$ in case of the subtraction $\{X-(Y+1)\}$ is generated. These overflow signals $C^0_M$ and $C^1_M$ are obtained in the manner similar to that in which the signals corresponding to the carries $C^0$ and $C^1$ to the most significant bit generated in the carry generation and propagation circuit 101 of FIG. 2. The value indicated by the overflow signal $C^0_M$ is "1" when the result of the subtraction $(X-Y)$ is equal to or less than $-1$. Further, the value indicated by the signal $C^1_M$, which represents an overflow occurs when the subtraction $\{X-(Y-1)\}$ is performed, is "1" if the result of the subtraction $(X-Y)$ is equal to or less than 0. Thus, when the overflow signal $C^0_M$ outputted from the carry generation and propagation producing circuit 1001 indicates "1", this signal $C^0_M$ indicates that the data X is less than the data Y and further this signal is outputted to the terminal L. Moreover, when the floating point overflow signal $C^{1m}$ outputted from the carry generation and propagation producing circuit 1001 indicates "0", this signal $C^1_M$ indicates that the data X is greater than the data Y and further this signal is logically inverted and outputted to the terminal G. Furthermore, in other cases, the overflow signals indicate that the data X is equal to the data Y. When the value indicated by the overflow signal $C^0_M$ is "0" and that indicated by the overflow signal $C^1_M$ is "1", a signal indicating "1" is outputted to the terminal E.

Thus, the carry generation and propagation producing circuit can be used in common to the generation of the floating point overflow signals $C^0_M$ and $C^1_M$. Thereby, the present invention can save a number of circuit elements included in the conventional arithmetic processor.

While the preferred embodiments of the present invention have been described, it is to be understood modifications will be apparent to those skilled in the art without departing from the spirit of the invention. The scope of the present invention, therefore, is to be determined solely by the appended claims.

What is claimed is:

1. A floating point processor responsive to input floating point numbers for performing floating point arithmetic operations on the input floating point numbers, comprising:
    a first arithmetic means for adding to or subtracting from a first fraction of a first floating point number, having an exponent larger than the exponent of the other floating point number, a second fraction of a second floating point number having a weight of corresponding bits equal to that of the first floating point number by being right shifted and the exponent is less than that of the first floating point number and for outputting the result of the addition or the subtraction;
    a second arithmetic means for performing the same one of adding and subtracting operations as said first arithmetic means effects on the first fraction and the sum of the second fraction and "1" and for outputting the result of the addition or the subtraction;
    an inverting means for reversing every bit of the output of said second arithmetic means; and
    a result selecting means for selecting the arithmetic operation from the outputs of said first and second arithmetic means and said inverting means.

2. A floating point processor as set forth in claim 1 which further comprises "carry for rounding" generation means for outputting a carry signal generated at a reference digital position when the rounding is performed at a predetermined digit, said carry signal indicating a carry obtained from parts of the first and the second fractions and data obtained at a guard bit, a round bit and sticky bit by making the weight of bit of the first floating point number equal to that of corresponding bit of the second floating point number, said result selecting means selecting one of the outputs of said first and second arithmetic means and said inverting means on the basis of the output of said "carry for rounding" generation means, a signal indicating one of the addition and the subtraction, the overflows and most significant bits in the outputs of said first and second arithmetic means.

3. A floating point processor responsive to input floating point numbers for performing floating point arithmetic operations on the input floating point numbers, comprising:
    first means for (a) performing a first operation wherein a first fraction of a first floating point number, having an exponent larger than the exponent of the other floating point number, is added to or subtracted from a second fraction of a second floating point number having (i) a weight of corresponding bits equal to that of the first floating point number by being right shift and (ii) an exponent less than that of the first floating point number, (b) deriving a first output that is the result of the addition or the subtraction of the first operation, (c) performing the same adding or subtracting operation as performed on the first fraction and the sum of the second fraction during the first operation and adding one to the resultant and (d) deriving a second output that is the result of operation (c);
    an inverting means for reversing every bit of the second output; and
    a result selecting means for selecting the arithmetic operation from the outputs of said first means and said inverting means.

4. A floating point processor as set forth in claim 3 which further comprises "carry for rounding" generation means for outputting a carry signal generated at a reference digital position when the rounding is performed at a predetermined digit, said carry signal indicating a carry obtained from the first fraction, part of the second fraction and data obtained at a guard bit, a round bit and a sticky bit by making the weight of bit of the first floating point number equal to that of corresponding bit of the second floating point number, said result selecting means selecting one of the outputs of said carry generation and propagation producing means and said inverting means on the basis of the output of said "carry for rounding" generating means, a signal indicating one of the addition and the subtraction, the overflows and most significant bits in the outputs of said carry generation and propagation producing means.

5. A floating point processor responsive to input signals representing floating point numbers for performing floating point arithmetic operations on the floating point numbers represented by the input signals, comprising:
- a first arithmetic means for linearly combining first and second signal values respectively representing first and second fractions of first and second floating point numbers, the first fraction having an exponent larger than the exponent of the other floating point number, said first arithmetic means shifting a second fraction of a second floating point number to cause the weight of corresponding bits to equal that of the first floating point number and the exponent to be less than that of the first floating point number and for deriving a first output signal representing the result of the linear combining of the first and second signal values;
- a second arithmetic means for performing the same linear combining operation as said first arithmetic means performs on the first fraction and the sum of the second fraction and "1" and for deriving a second output signal representing the result of the linear combining by the second arithmetic means;
- an inverting means for reversing every bit of the second output signal; and
- a result selecting means for selecting the arithmetic operation from the output signals of said first and second arithmetic means and said inverting means.

6. A floating point processor as set forth in claim 5 which further comprises "carry for rounding" generation means for deriving a carry signal, the carry signal being derived at a reference digital position in response to the rounding being performed at a predetermined position in response to the rounding being performed at a predetermined digit, said carry signal indicating a carry obtained from part of the first and second fractions and data obtained at a guard bit, a round bit and a sticky bit by causing the bit weight of the first floating point number to equal that of a corresponding bit of the second floating point number, said result selecting means selecting one of the outputs of said first and second arithmetic means and said inverting means on the basis of the output of said "carry for rounding" generation means, a signal indicating whether the linear combining operation is an addition or a subtraction, the overflows and most significant bits in the outputs of said first and second arithmetic means.

7. A floating point processor responsive to input signals representing floating point numbers for performing floating point arithmetic operations on floating point numbers represented by the input signals, comprising:
- a carry generation and propagation producing means for (a) linearly combining first and second fractions of first and second floating point numbers, the first fraction having an exponent which is larger than the exponent of the other floating point number, the second floating point number having a weight of corresponding bits equal to that of the first floating point number and an exponent less than that of the first floating point number, (b) deriving a first output signal representing the result of the linear combining of the first and second fractions (c) performing the same linear combining operation as performed on the first fraction and the sum of the second fraction and "1" and (d) deriving a second output signal representing the result of the operation performed on the first fraction and the sum of the second fraction and "1";
- an inverting means for reversing every bit of the second output signal; and
- a result selecting means for selecting the arithmetic operation from the outputs of said carry generation and propagation producing means and said inverting means.

8. A floating point processor as set forth in claim 7 which further comprises "carry for rounding" generation means for deriving a carry signal, the carry signal being derived at a reference digital position responsive to the rounding being performed at a predetermined digit, said carry signal indicating a carry obtained from the first fraction, part of the second fraction and data obtained at a guard bit, a round bit and a sticky bit by causing the bit weight of the first floating point number to equal that of a corresponding bit of the second floating point number, said result selecting means selecting one of the outputs of said carry generation and propagation producing means and said inverting means on the basis of the output of said "carry for rounding" generation means, a signal indicating whether the linear combining operation is an addition or a subtraction, the overflows and most significant bits in the outputs of said carry generation and propagation producing means.

* * * * *